US012137158B2

United States Patent
Polyakov et al.

(10) Patent No.: US 12,137,158 B2
(45) Date of Patent: Nov. 5, 2024

(54) LARGE-WORD APPROXIMATE HOMOMORPHIC ENCRYPTION

(71) Applicant: Duality Technologies, Inc., Maplewood, NJ (US)

(72) Inventors: Yuriy Polyakov, Fair Lawn, NJ (US); Yuval Harness, Ramat Hasharon (IL)

(73) Assignee: Duality Technologies, Inc., Maplewood, NJ (US)

( * ) Notice: Subject to any disclaimer, the term of this patent is extended or adjusted under 35 U.S.C. 154(b) by 246 days.

(21) Appl. No.: 17/738,666

(22) Filed: May 6, 2022

(65) Prior Publication Data
US 2022/0376891 A1 Nov. 24, 2022

Related U.S. Application Data (60) Provisional application No. 63/185,617, filed on May 7, 2021.

(51) Int. Cl.
*H04L 9/00* (2022.01)
*G06F 17/14* (2006.01)

(52) U.S. Cl.
CPC .............. *H04L 9/008* (2013.01); *G06F 17/14* (2013.01); *H04L 2209/08* (2013.01); *H04L 2209/16* (2013.01)

(58) Field of Classification Search
CPC . H04L 9/008; H04L 2209/08; H04L 2209/16; G06F 17/14; G06F 17/18
See application file for complete search history.

(56) References Cited

U.S. PATENT DOCUMENTS

| 10,511,434 | B2 * | 12/2019 | Jost | H04L 9/304 |
| 10,684,340 | B1 * | 6/2020 | Zhong | A61B 5/055 |
| 11,101,976 | B2 * | 8/2021 | Cheon | H04L 9/304 |
| 2019/0132156 | A1 * | 5/2019 | Wang | H04L 25/024 |

(Continued)

FOREIGN PATENT DOCUMENTS

CN 101345618 * 11/2021 ............. G06F 7/548

(Continued)

OTHER PUBLICATIONS

Jutla, Charanjit Singh, and Nathan Manohar. "Sine Series Approximation of the Mod Function for Bootstrapping of Approximate HE." *Cryptology ePrint Archive* (2021).

(Continued)

*Primary Examiner* — Meng Li
(74) *Attorney, Agent, or Firm* — PEARL COHEN ZEDEK LATZER BARATZ LLP (57) ABSTRACT

Systems and methods for cryptography based on 128 bit integers include: receiving a complex input, the input including a 128-bit number; encrypting by: setting an imaginary part of the input to a predetermined value; encrypting the input using a Fourier transform and a scaling factor; adding a first noise and a second noise to the encrypted input, wherein the second noise obfuscates the first noise; and decrypting by: receiving the encrypted input with added first noise and second noise; estimating a standard deviation of the first noise based on an imaginary part of the received encrypted complex input; computing a standard deviation of the second noise based on the standard deviation of the first noise and a predetermined parameter; and decrypting the encrypted message using an inverse Fourier transform, the first noise, and the second noise.

16 Claims, 6 Drawing Sheets

(56) References Cited

U.S. PATENT DOCUMENTS

| | | | |
|---|---|---|---|
| 2019/0296910 A1* | 9/2019 | Cheung | H04L 9/008 |
| 2020/0228307 A1* | 7/2020 | Cheon | H04L 9/3093 |
| 2021/0135837 A1* | 5/2021 | Cheung | H04L 9/008 |
| 2021/0319131 A1* | 10/2021 | Salomon | G06F 16/24528 |
| 2021/0328766 A1* | 10/2021 | No | H04L 9/3093 |
| 2022/0198254 A1* | 6/2022 | Dalli | G06N 3/065 |
| 2022/0376891 A1* | 11/2022 | Polyakov | G06F 17/18 |
| 2023/0188319 A1* | 6/2023 | Froelicher | G06N 3/08 |
| | | | 713/189 |
| 2023/0291552 A1* | 9/2023 | Michel | H04L 9/3093 |

OTHER PUBLICATIONS

Li, Balyu, and Daniele Micciancio. "On the security of homomorphic encryption on approximate numbers." *Annual International Conference on the Theory and Applications of Cryptographic Techniques.* Springer, Cham, 2021.

Kim, Andrey, Antonis Papadimitriou, and Yuriy Polyakov. "Approximate homomorphic encryption with reduced approximation error." *Cryptographers' Track at the RSA Conference.* Springer, Cham, 2022.

\* cited by examiner

LARGE-WORD APPROXIMATE HOMOMORPHIC ENCRYPTION

CROSS-REFERENCE TO RELATED APPLICATIONS

This application claims the benefit of and priority to U.S. Provisional Patent Application No. 63/185,617 filed May 7, 2021, which is owned by the assignee of the instant application and incorporated herein by reference in its entirety.

FIELD OF THE INVENTION

The invention relates generally to improved security using large-word approximate homomorphic encryption

BACKGROUND

Currently, the Cheon-Kim-Kim-Song (CKKS) homomorphic encryption (HE) scheme is known as being an efficient method to perform approximate homomorphic computations over encrypted real and complex numbers. To achieve the best runtime efficiency, the CKKS variants used in practice typically work with large numbers (e.g. larger than 64 bits) represented in the Residue Number Representation (RNS) obtained using the Chinese Remainder Theorem. Each large number can be decomposed into multiple small numbers (RNS residues) with respect to moduli that are limited to the 64 bit limit of modern CPU-based computer architectures. The use of 64 bit words in the RNS variants of CKKS can introduce two significant constraints in applying CKKS for practical problems.

The first constraint can be related to the use of CKKS for security models where decryption results may be shared. These models correspond to the notion of IND-CPA+ security (ciphertext indistinguishability under chosen plaintext attack). It has recently been demonstrated that the decryption result in the original CKKS can be used for a successful attack on the secret key in the IND-CPA+ setting.

The second constraint applies to scenarios where the CKKS bootstrapping procedure is applied for supporting deep computations, such as in regression training or neural net inference. Some recent results for RNS-based CKKS bootstrapping show that the maximum precision after a first bootstrapping that can be achieved in practice for 128-bit-secure settings can be less than 15 bits (in practical computations this number is significantly lower). The precision can decline as more bootstrapping operations are performed, e.g., to about 12 bits after 20 bootstrapping iterations. This limitation can be present due to the RNS residues (and hence the CKKS scaling factor) cannot be larger than 64 bits (in practice only 60 bits as modular reduction algorithms typically do not support larger moduli) in all existing implementations of CKKS RNS variants.

SUMMARY

Advantages of the invention may include mitigating IND-CPA+ attacks by adding random noise and/or rounding result during decryption. Advantages of the invention may be due to using a noise magnitude (or e.g., equivalently rounding precision) that is significantly higher than currently known approximation noise, by at least, for example, 20 or 30 bits. This may result in the RNS moduli needing to be increased by e.g., 20-30 bits, requiring residue arithmetic with numbers larger than 64 bits.

According to one or more embodiments, a method for cryptography based on 128 bit integers, includes: receiving a complex input to be encrypted, wherein the input includes a 128-bit number; performing encrypting by: setting an imaginary part of the complex input to a predetermined value; encrypting the complex input using a Fourier transform and a scaling factor; adding a first noise and a second noise to the encrypted complex input, wherein the second noise obfuscates the first noise; and performing decrypting by: receiving the encrypted complex input with added first noise and second noise; estimating a first standard deviation of the first noise based on an imaginary part of the received encrypted complex input; computing a second standard deviation of the second noise based on the first standard deviation of the first noise and a predetermined parameter; and decrypting the encrypted message using an inverse Fourier transform, the first noise, and the second noise.

According to some embodiments, the predetermined value is zero.

According to some embodiments, the first noise is chosen from a list comprising: a Gaussian distribution; and a uniform random distribution.

According to some embodiments, the second noise is chosen from a list comprising: a Gaussian distribution; and a uniform random distribution.

According to some embodiments, the second noise is at least 20 bits larger than the first noise.

According to some embodiments, a homomorphic operation is performed on the encrypted complex input with added first noise and second noise prior to decrypting.

According to one or more embodiments, a method for cryptography based on 128-bit integers, includes: receiving a complex input x, wherein $x \in \mathbb{C}^n$ and each entry in x is 128-bits, wherein encrypting includes: setting the imaginary parts of the complex input x to zero during an encryption process; encrypting the complex input using an encrypting Fourier transform and a scaling factor to obtain an encrypted message m, wherein $m = \lfloor \mathcal{F}(\Delta \cdot x) \rceil$, wherein $\mathcal{F}$ is the encrypting Fourier transform and $\Delta$ is the scaling factor; introducing a first noise e; and introducing a second noise e'; and wherein decrypting includes: receiving an encrypted message with added first and second noise m+e+e'; decrypting the encrypted message with added first and second noise using an inverse of the encrypting Fourier transform to obtain an approximation of the encrypted message m and the first noise e, wherein $$x' = \mathcal{F}^{-1}\left(\frac{m+e}{\Delta}\right) \approx x;$$

estimating the standard deviation $\sigma_e$ of the first noise e based on an imaginary part of m; computing the standard deviation $\sigma_{e'}$ of the second noise e' according to the expression $\sigma_{e'} = \sqrt{M+1} \cdot \sigma_e$, wherein M is a predetermined parameter; calculating the second noise e' from its standard deviation; and decoding $$x' = \mathrm{Re}\left[\mathcal{F}^{-1}\left(\frac{m+e+e'}{\Delta}\right)\right] \approx x.$$

According to some embodiments, the first error is introduced using a distribution from a list comprising: a Gaussian distribution; and a uniform random distribution.

According to some embodiments, the second error is introduced using a distribution from a list comprising: a Gaussian distribution; and a uniform random distribution.

According to some embodiments, the magnitude of the second noise is large enough to erase all information about the first noise.

According to some embodiments, the second noise is at least 20 bits larger than the first noise.

According to some embodiments, a homomorphic operation is performed on the encrypted complex input with added first noise and second noise prior to decrypting.

According to one or more embodiments, a system for cryptography based on 128 bit integers includes: at least one processor; and a memory containing instructions which when executed by at least one processor cause the at least one processor to: receive a complex input to be encrypted, wherein the input includes a 128-bit number; perform encrypting by: setting an imaginary part of the complex input to a predetermined value; encrypting the complex input using a Fourier transform and a scaling factor; adding a first noise and a second noise to the encrypted complex input, wherein the second noise obfuscates the first noise; and perform decrypting by: receiving the encrypted complex input with added first noise and second noise; estimating a first standard deviation of the first noise based on an imaginary part of the received encrypted complex input; computing a second standard deviation of the second noise based on the first standard deviation of the first noise and a predetermined parameter; and decrypting the encrypted message using an inverse Fourier transform, the first noise, and the second noise.

According to some embodiments, wherein the at least one processor is a 128 bit processor.

According to some embodiments, a homomorphic operation is performed on the encrypted complex input with added first noise and second noise prior to decrypting.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, may be understood by reference to the following detailed description when read with the accompanied drawings. Embodiments are illustrated without limitation in the figures, in which like reference numerals indicate corresponding, analogous, or similar elements, and in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Figure 1A:
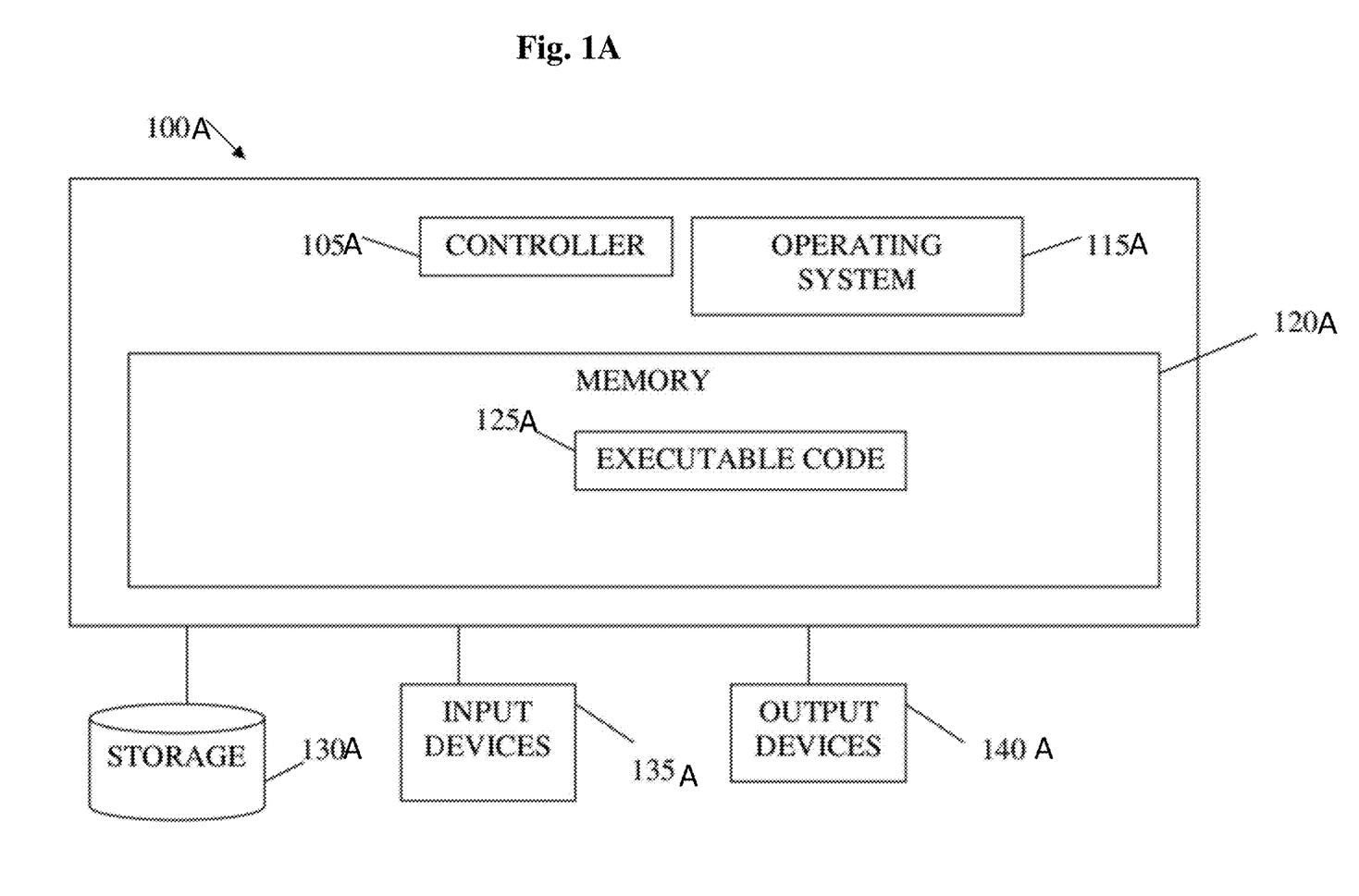
FIG. 1A is a block diagram of an exemplary computing device which may be used with embodiments of the present invention.

FIG. 1A shows a block diagram of an exemplary computing device which may be used with embodiments of the present invention. Computing device 100A may include a controller or computer processor 105A that may be, for example, a central processing unit processor (CPU), a chip or any suitable computing device, an operating system 115A, a memory 120A, a storage 130A, input devices 135A and output devices 140A such as a computer display or monitor displaying for example a computer desktop system.

Operating system 115A may be or may include code to perform tasks involving coordination, scheduling, arbitration, or managing operation of computing device 100A, for example, scheduling execution of programs. Memory 120A may be or may include, for example, a Random Access Memory (RAM), a read only memory (ROM), a Flash memory, a volatile or non-volatile memory, or other suitable memory units or storage units. At least a portion of Memory 120A may include data storage housed online on the cloud. Memory 120A may be or may include a plurality of different memory units. Memory 120A may store for example, instructions (e.g. code 125A) to carry out a method as disclosed herein. Memory 120A may use a datastore, such as a database.

Executable code 125A may be any application, program, process, task, or script. Executable code 125A may be executed by controller 105A possibly under control of operating system 115A. For example, executable code 125A may be, or may execute, one or more applications performing methods as disclosed herein, such as a machine learning model, or a process providing input to a machine learning model. In some embodiments, more than one computing device 100A or components of device 100A may be used. One or more processor(s) 105A may be configured to carry out embodiments of the present invention by for example executing software or code. Processor 105A may be a 128 bit processor.

Storage 130A may be or may include, for example, a hard disk drive, a floppy disk drive, a compact disk (CD) drive, a universal serial bus (USB) device or other suitable removable and/or fixed storage unit. Data described herein may be stored in a storage 130A and may be loaded from storage 130A into a memory 120A where it may be processed by controller 105A. Storage 130A may include cloud storage. Storage 130A may include storing data in a database.

Input devices 135A may be or may include a mouse, a keyboard, a touch screen or pad or any suitable input device or combination of devices. Output devices 140A may include one or more displays, speakers and/or any other suitable output devices or combination of output devices. Any applicable input/output (I/O) devices may be connected to computing device 100A, for example, a wired or wireless network interface card (NIC), a modem, printer, a universal serial bus (USB) device or external hard drive may be included in input devices 135A and/or output devices 140A.

Embodiments of the invention may include one or more article(s) (e.g. memory 120A or storage 130A) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Figure 1B:
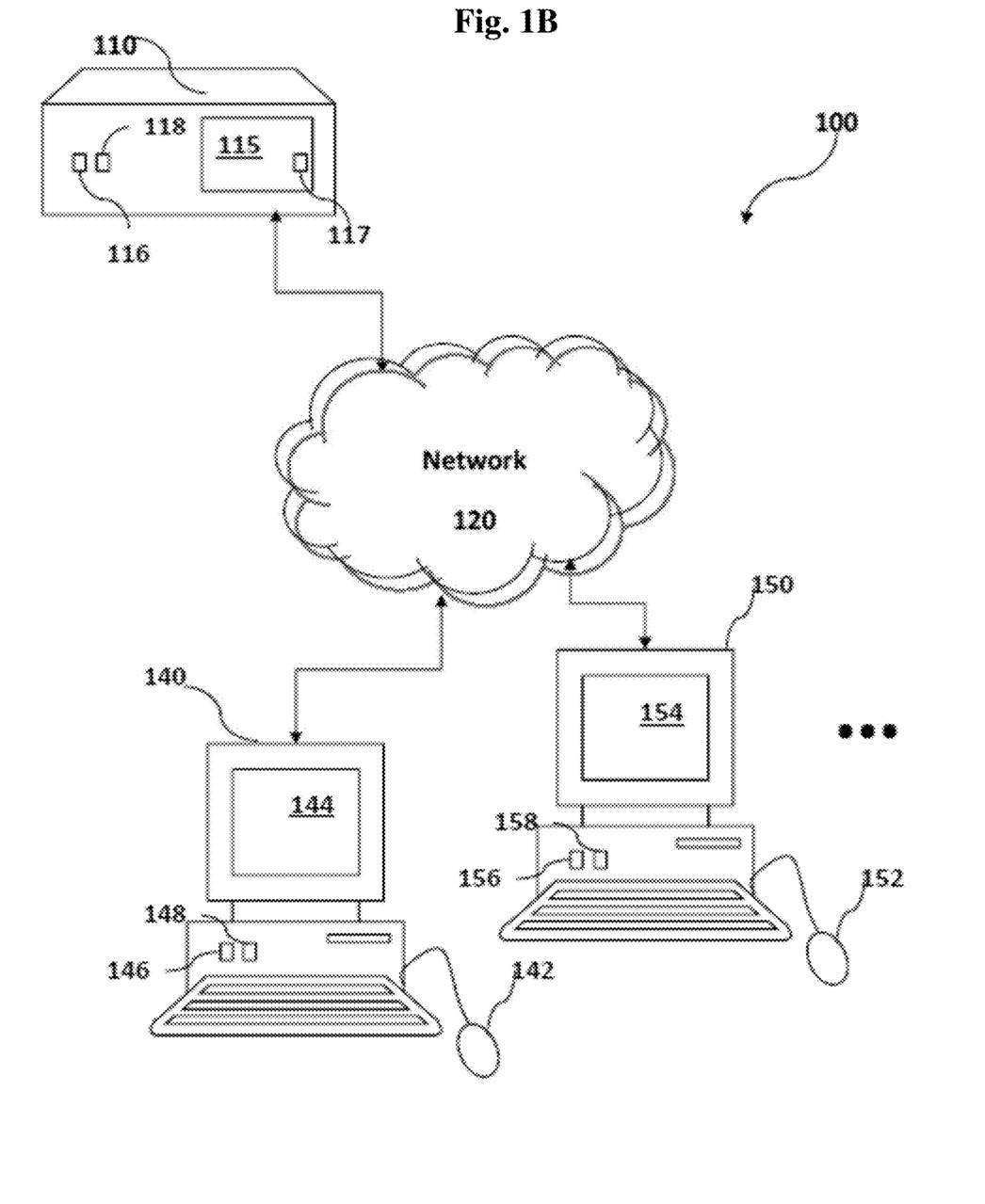
FIG. 1B is schematic drawing of a system, according to some embodiments of the invention.

FIG. 1B is a schematic drawing of a system 100 according to some embodiments of the invention. System 100 may include one or more server(s) 110, database(s) 115, and/or computer(s) 140, 150, . . . , etc. Any or all of system 100 devices may be connected via one or more network(s) 120. Network 120, which connects server(s) 110 and computers 140 and 150, may be any public or private network such as the Internet. Access to network 120 may be through wire line, terrestrial wireless, satellite or other systems well known in the art.

Server(s) 110 and computers 140 and 150, may include one or more controller(s) or processor(s) 116, 146, and 156, respectively, for executing operations according to embodiments of the invention and one or more memory unit(s) 118, 148, and 158, respectively, for storing data (e.g., encryption and/or decryption keys, and encrypted and/or decrypted data) and/or instructions (e.g., software for applying computations or calculations, keys to encrypt or decrypt data according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Computers 140 and 150 may be servers, personal computers, desktop computers, mobile computers, laptop computers, and notebook computers or any other suitable device such as a cellular telephone, personal digital assistant (PDA), video game console, etc., and may include wired or wireless connections or modems. Computers 140 and 150 may include one or more input devices 142 and 152, respectively, for receiving input from a user (e.g., via a pointing device, click-wheel or mouse, keys, touch screen, recorder/microphone, other input components). Computers 140 and 150 may include one or more output devices 144 and 154 (e.g., a monitor or screen) for displaying data to a user provided by or for server(s) 110.

Database 115 may include software processes or applications for storing and retrieving data 117 such as large-word data structures and large-work CKKS computations, and/or encryption and/or decryption keys. Data 117 may also include code (e.g., software code) or logic, e.g., to enable the application of large-work CKKS algorithms according to embodiments of the invention. Database 115 may be internal or external to one or more of server(s) 110 and/or computer(s) 140 and/or 150 (not shown) and may be connected thereto by a local or remote and a wired or wireless connection. In some embodiments, data 117 is stored in an alternate location separate from database 115, e.g., memory unit(s) 118, 148, and/or 158.

Any of system 100 devices may operate as a secure or insecure party. Secure parties may each securely store unencrypted (or encrypted) data and private keys associated with each dataset, party, etc. Insecure parties may not access the unencrypted data or private keys.

According to some embodiments, instead of using machine-word-size 64-bit integers for residue numeral systems (RNS), larger words (e.g. larger than 64 bits) are used to support higher values of the CKKS scaling factor, which increases the precision of computation results. For example, one particular integer data type that may be used by some embodiments of the invention is (unsigned)_int128 supported by g++ and clang++ compilers for CPU systems, which is based on a combination of hardware instructions and some software techniques. According to some embodiments, pure software implementations of 128-bit or higher-bitwidth integers may also be used. On hardware systems that natively support integers larger than 64 bits, these native integer data types may be employed for RNS residues.

Figure 2A:
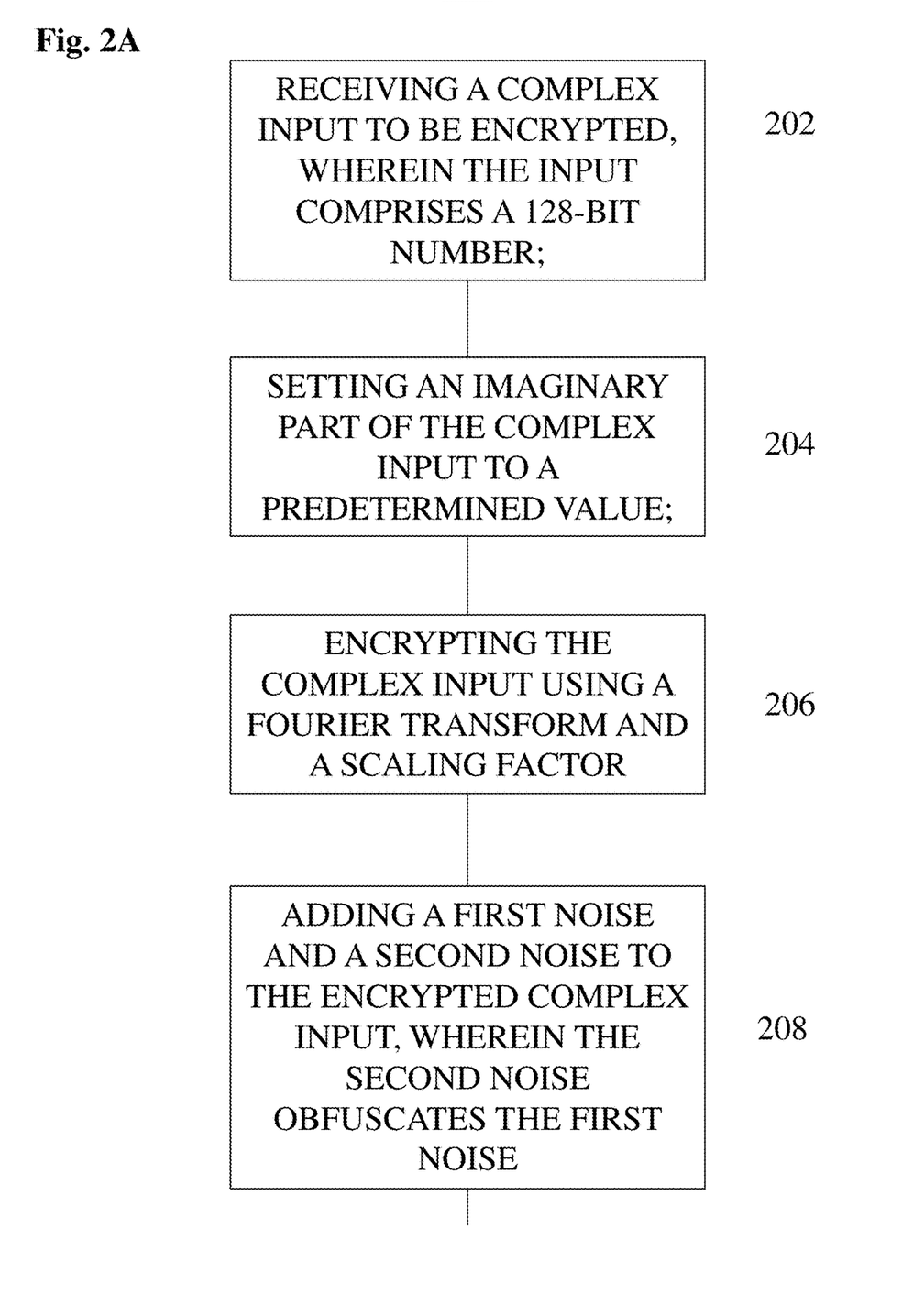
FIG. 2A and FIG. 2B are a flowchart of a method for cryptography, according to some embodiments of the invention.
Figure 2B:
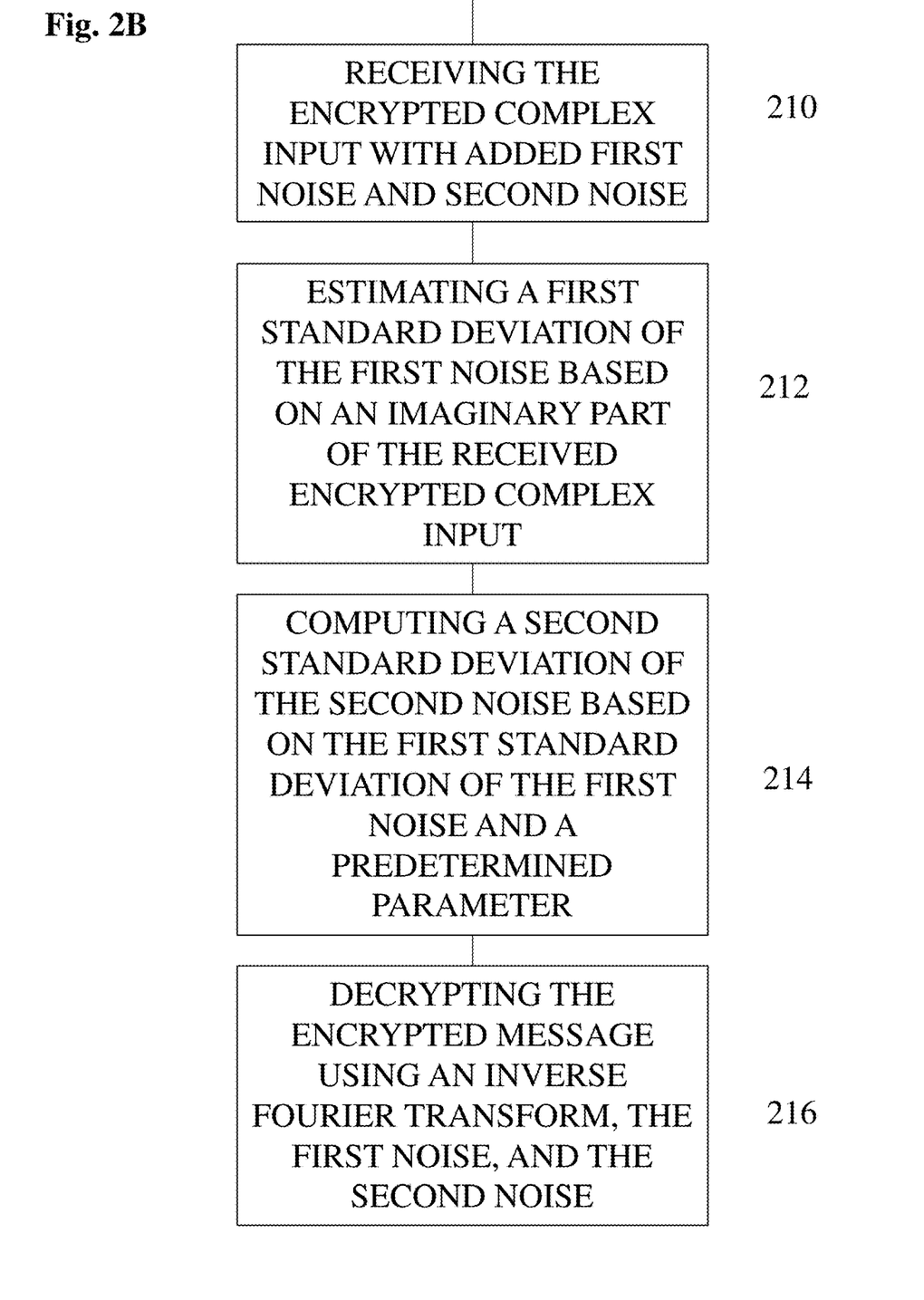

FIG. 2A and FIG. 2B are a flowchart for a method 200 of cryptography, according to some embodiments. Method 200 may be a method of cryptography based on 128 bit integers that precludes reducing the 128 bit integer from being segmented into smaller words before encryption. Method 200 may include receiving (e.g., via a computer processor as described above in FIG. 1A or 1B) a complex input to be encrypted (Step 202). The input may be the input to be encrypted. The input may belong to the vector space $\mathbb{C}^n$ for some integer n, where $\mathbb{C}$ is the set of complex numbers. The input may be an n-dimensional vector with numeric entries which have a real part and an imaginary part. Each entry of the input to be encrypted may include a 128 bit number.

Encryption according to method 200 may include setting an imaginary part of the complex input to a predetermined value (Step 204). In some embodiments, the predetermined value is zero. In various embodiments, each imaginary part of the complex input, e.g. the imaginary part of each of the n entries of the input, may be set to the same or different predetermined value.

Encryption according to method 200 may include encrypting the complex input (e.g. the complex input with imaginary part set to the predetermined value) using a Fourier transform and a scaling factor (Step 206). For example, encrypting may include calculating according to EQN. 1, as shown below:

$$m = \lfloor \mathcal{F}(\Delta \cdot x) \rceil, \qquad \text{EQN. 1}$$

where m is the encrypted output (e.g. encrypted message), $\mathcal{F}$ is a Fourier transform, $\Delta$ is a scaling factor, x is the complex input, and the notation $\lfloor * \rceil$ means to take the nearest integer value in an element-wise way.

In some embodiments, $\mathcal{F}$ is a Cooley-Tukey design of a discrete Fourier transform (DFT). In some embodiments, an inverse Fourier transform is used for encryption, with a corresponding forward Fourier transform used for decryption.

The scaling factor $\Delta$ may be a CKKS scaling factor.

The method can also involve adding a first noise and a second noise to the encrypted complex input, wherein the second noise obfuscates the first noise (Step 208). The first nose e may be introduced to the encrypted complex input, for example by adding it to the encrypted complex input to obtain m+e. In various embodiments, the first noise is introduced using a distribution from a list including: a Gaussian distribution; and a uniform random distribution.

The second noise e' may be introduced to the encrypted complex input, for example in addition to the first noise to obtain m+e+e'. The second noise e' may obfuscate the first noise e, for example so that the first noise cannot be easily determined. The magnitude of the second noise may be at least 20 to 30 bits larger than the first noise in order to erase all information about the first noise, a technique which may be referred to as "noise flooding." In various embodiments, the second noise is introduced using a distribution from a list including: a Gaussian distribution; and a uniform random distribution.

In some embodiments, homomorphic operations are performed on the encrypted message, e.g. on the encrypted complex input with added noise.

Decryption according to method 200 may include receiving an encrypted message m+e+e', e.g. an encrypted complex input with added noise (Step 210), for example inclusive of a first noise and a second noise.

Decryption according to method 200 may include reversing the encryption steps, for example using an inverse of the encrypting Fourier transform. For example, decrypting may include calculating as shown below in EQN. 2

$$x' = \mathcal{F}^{-1}\left(\frac{m+e}{\Delta}\right) \approx x, \qquad \text{EQN. 2}$$

where $\mathcal{F}$ is the inverse of the Fourier transform used during encryption.

In some embodiments, the method involves estimating a first standard deviation $\sigma_e$ of the first noise e based on the imaginary part of the decoded complex input x' (Step 212). Because the imaginary part of the complex input is set to a predetermined value (e.g. zero) during encoding, then the imaginary part of the encrypted message may only contains information about the noise which may be used to decode the encrypted message and obtain the original complex input. According to some embodiments, the real part of the decoded complex input x' is calculated as shown below in EQN. 3:

$$Re(x') = \frac{1}{2}(m(Y) + e(Y) + m(1/Y) + e(1/Y)), \qquad \text{EQN. 3}$$

and the imaginary part of x' as its conjugate as shown below in EQN. 4:

$$Im(x') = \frac{1}{2}(m(Y) + e(Y) - m(1/Y) - e(1/Y)), \qquad \text{EQN. 4}$$

wherein, Re denotes taking the real part, Im denotes taking the imaginary part, Y and 1/Y correspond to primitive roots of unity and their inverses, and f (Y) is a polynomial over Y that corresponds to the vector f, e.g. the coefficients of f (Y) are the components in the vector f.

In some embodiments, the method involves determining the standard deviation $\sigma_{e'}$ of the second noise e' (e.g. estimate a further, second standard deviation) based on the estimated standard deviation $\sigma_e$ of the first noise and a predetermined (e.g. configurable) parameter (Step 214). For example, the standard deviation of the second noise may be calculated as shown below in EQN. 5:

$$\sigma_{e'} = \sqrt{1+M} \cdot \sigma_e \qquad \text{EQN. 5}$$

wherein M is a configurable parameter. For example, M may correspond to the number of decryption results for the same or related ciphertexts that may be made available to an adversary. Related ciphertexts may be ciphertexts which are encrypted with the same public key. Practical noise flooding conditions may be achieved when M is at least $2^{40}$, but higher or lower values may be used based on a specific application.

Once the standard deviation $\sigma_{e'}$ of the second noise has been calculated, the second noise e' may be recreated by generating it from its standard deviation.

Embodiments decrypt (216) the encrypted message using an inverse Fourier transform, the first noise, and the second noise, for example by calculating the decoded complex input as shown below in EQN. 6:

$$x' = Re\left[\mathcal{F}^{-1}\left(\frac{m+e+e'}{\Delta}\right)\right] \approx x. \qquad \text{EQN. 6}$$

In various embodiments, the invention can involve a method to support CKKS bootstrapping which may, for example, achieve high precision.

A conventional approach for approximating the modular reduction in CKKS bootstrapping is based on approximating the modular reduction using a sine wave as shown below in EQN. 7:

$$[x]_q \approx \frac{q}{2\pi}\sin\left(\frac{2\pi x}{q}\right), \qquad \text{EQN. 7}$$

where $[x]_q$ denotes a modular reduction of an input x modulo q. The approximation may be followed by a polynomial approximation of the sine wave, e.g., using a Chebyshev interpolation, computed for a specific range {−K+1, K−1}. Introducing $$t = \frac{q}{x},$$

the expression may be rewritten more simply as shown below in EQN. 8:

$$[t]_q \approx \frac{1}{2\pi}\sin(2\pi t) \qquad \text{EQN. 8}$$

Figure 3:
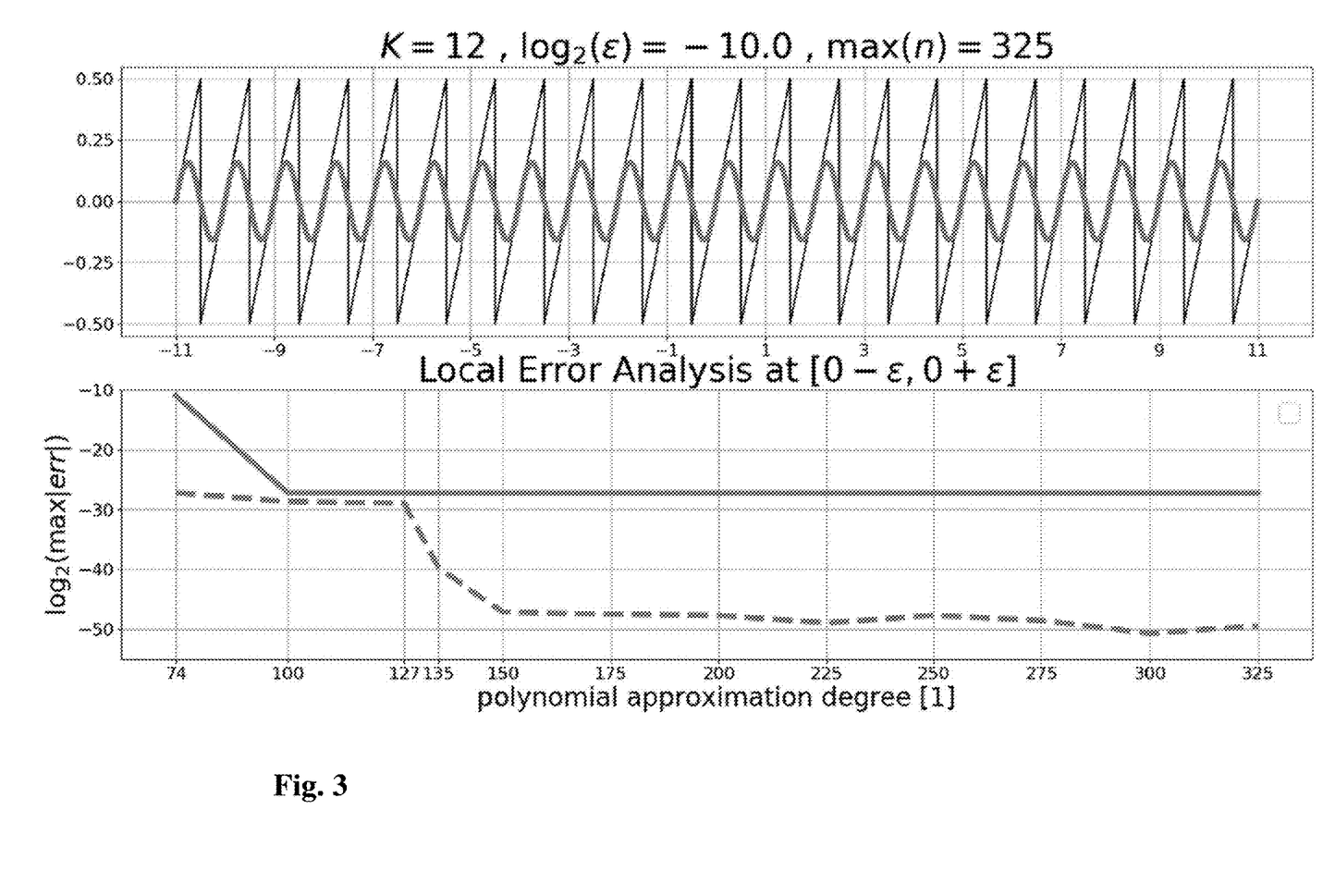
FIG. 3 is a graph showing a modular reduction approximation, according to some embodiments of the invention.

FIG. 3 shows a graph of a modular reduction approximation, according to embodiments of the invention. The modular reduction approximation shown is $$[x]_q \approx \frac{1}{2\pi}\sin(2\pi x)$$

for the range where $\epsilon = |x/q| \leq 2^{-10}$. The solid line in the lower graph denotes and error of the sine wave in the upper graph with respect to modular reduction and the dashed line in the lower graph denotes the error of the polynomial approximation with respect to the sine wave in the upper graph. As can be seen in FIG. 3, one problem with this approach is that maximum precision is limited to 27 bits (for $\epsilon = |x/q| \leq 2^{-10}$), no matter how accurate the polynomial approximation of the sine wave is. As many computations may be performed after the modular reduction approximation, this may significantly limit the precision that may be achieved even after a single CKKS bootstrapping (e.g. to less than 20 bits).

Embodiments of the invention may provide a more accurate approximation of the modular reduction (e.g. achieving 40-50 bits of precision or even more, instead of 27 bits for the above described scenario) using a trigonometric Hermite interpolation of the modular reduction, thereby supporting CKKS bootstrapping under IND-CPA+security and/or deeper computations under the regular IND-CPA model.

An m-order trigonometric Hermite interpolation may be written as shown below in EQN. 9:

$$s_m(t) = \frac{a_0}{2} + \sum_{k=1}^{m} [a_k \cos(2\pi kt) + b_k \sin(2\pi kt)], \quad \text{EQN. 9}$$

such that: $s_m(p)=0$, $s'_m(p)=1$, and $s_m^{(\ell)}(p)=0$ for $\ell > 1$, wherein p corresponds to the points in the range $\{-K+1, K-1\}$ used in the interpolation. Embodiments use $a_0=a_k=0$ in the case of modular reduction.

The Hermite interpolation expressions for approximating the modular reduction may be computed analytically for any order. The first three orders are shown below in EQNS. 10, 11, and 12

$$s_1(t) = \frac{1}{2\pi}\sin(2\pi t), \quad \text{EQN. 10}$$

$$s_2(t) = \frac{2}{3\pi}\sin(2\pi t) - \frac{1}{12\pi}\sin(4\pi t), \quad \text{EQN. 11}$$

$$s_3(x) = \frac{3}{4\pi}\sin(2\pi t) - \frac{3}{20\pi}\sin(4\pi t) + \frac{1}{60\pi}\sin(6\pi t) \quad \text{EQN. 12}$$

As can be seen, $s_1(t)$ of EQN. 10 is the same sine wave interpolation used in prior CKKS bootstrapping work (EQN. 8) when $$t = \frac{q}{x}.$$

Each sine wave term in $s_2(t)$ and $s_3(t)$ may be approximated using an initial interpolation $s_1(t)$ for a smaller range computed using the Chebyshev interpolation, and then the range may be extended using a recursive application of the double-angle trigonometric formula. These computations may be performed using cosines (with only real-number coefficients).

Figure 4:
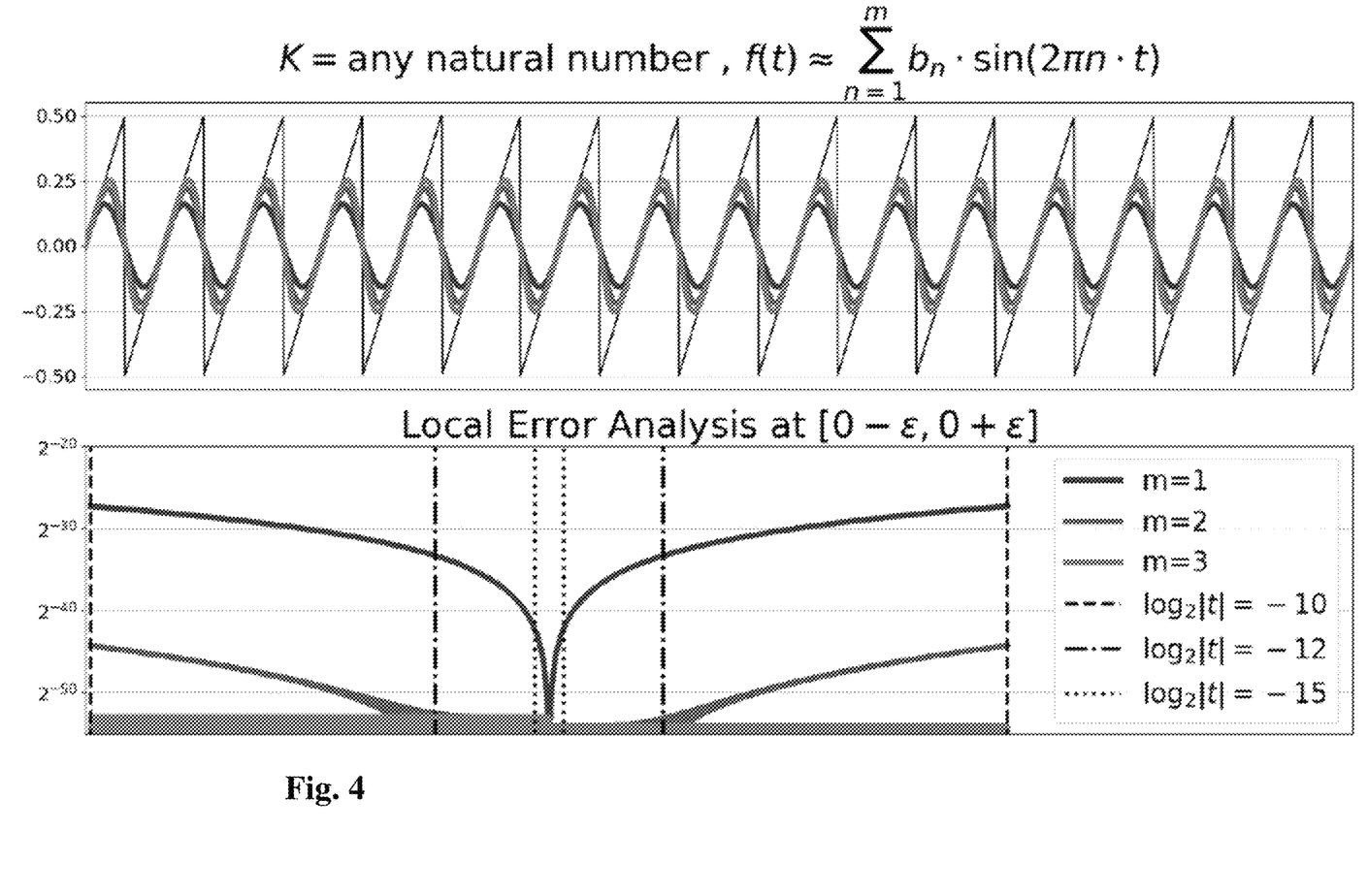
FIG. 4 is a graph of a comparison of local errors for three interpolations with respect to modular reduction, according to some embodiments of the invention.

FIG. 4 shows a comparison of local errors for all three interpolations with respect to modular reduction, according to some embodiments of the invention. Some embodiments of the invention are directed to the range $[0-\epsilon, 0+\epsilon]$, where $\epsilon = \max(|x/q|)$ is between $2^{-15}$ and $2^{-10}$. For $\epsilon = 2^{-10}$, the local errors of $s_2(t)$ and $s_3(x)$ do not exceed $2^{-44}$ and $2^{-53}$, respectively, as compared to $2^{-27}$ for $s_1(t)$. This shows that embodiments of the invention may increase the precision of CKKS bootstrapping by 17 and 26 bits, respectively, which achieves practical IND-CPA+security.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including, or storing instructions, e.g., computer-executable instructions, which when executed by a processor or controller, cause the processor or controller to carry out methods disclosed herein.

It should be recognized that embodiments of the invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures, and examples.

It is to be understood that the details set forth herein do not construe a limitation to an application of the invention.

Furthermore, it is to be understood that the invention may be carried out or practiced in various ways and that the invention may be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "may" or "could" be included, that a particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for cryptography based on 128 bit integers, comprising:
receiving a complex input to be encrypted, wherein the input comprises a 128-bit number;
performing encrypting comprising:
setting an imaginary part of the complex input to a predetermined value;
encrypting the complex input using a Fourier transform and a scaling factor;
adding a first noise and a second noise to the encrypted complex input, wherein the second noise obfuscates the first noise; and
performing decrypting comprising:
receiving an encrypted message with the encrypted complex input with added first noise and second noise over a network connecting system devices performing the encrypting and decrypting;
estimating a first standard deviation of the first noise based on an imaginary part of the received encrypted complex input;
computing a second standard deviation of the second noise based on the first standard deviation of the first noise and a predetermined parameter; and
decrypting the encrypted message using an inverse of the encrypting Fourier transform, the first noise, and the second noise.

2. The method of claim 1, wherein the predetermined value is zero.

3. The method of claim 1, wherein the first noise is chosen from a list comprising: a Gaussian distribution; and a uniform random distribution.

4. The method of claim 1, wherein the second noise is chosen from a list comprising: a Gaussian distribution; and a uniform random distribution.

5. The method of claim 1, wherein the second noise is at least 20 bits larger than the first noise.

6. The method of claim 1, wherein a homomorphic operation is performed on the encrypted complex input with added first noise and second noise prior to decrypting.

7. The method of claim 1, wherein the Fourier transform for encrypting is an inverse Fourier transform and the inverse of the encrypting Fourier transform for decrypting is a forward Fourier transform.

8. A method for cryptography based on 128-bit integers, comprising:
receiving a complex input x, wherein $x \in \mathbb{C}^n$ for an integer n and each entry in x is 128-bits,
wherein encrypting comprises:
setting the imaginary parts of the complex input x to zero during an encryption process;
encrypting the complex input using an encrypting Fourier transform and a scaling factor to obtain an encrypted message m, wherein $m = \lfloor \mathcal{F}(\Delta \cdot x) \rceil$, wherein $\mathcal{F}$ is the encrypting Fourier transform and $\Delta$ is the scaling factor;
introducing a first noise e; and
introducing a second noise e'; and
wherein decrypting comprises:
receiving the encrypted message with added first and second noise m+e+e' over a network connecting system devices performing the encrypting and decrypting;
decrypting the encrypted message with added first and second noise using an inverse of the encrypting Fourier transform to obtain an approximation of the encrypted message m and the first noise e, wherein $$x' = \mathcal{F}^{-1}\left(\frac{m+e}{\Delta}\right) \approx x;$$

estimating the standard deviation $\sigma_e$ of the first noise e based on an imaginary part of m;
computing the standard deviation $\sigma_{e'}$ of the second noise e' according to the expression $\sigma_{e'} = \sqrt{M+1} \cdot \sigma_e$, wherein M is a predetermined parameter;
calculating the second noise e' from its standard deviation; and
decoding $$x' = \text{Re}\left[\mathcal{F}^{-1}\left(\frac{m+e+e'}{\Delta}\right)\right] \approx x.$$

9. The method of claim 8, wherein the first noise is introduced using a distribution from a list comprising: a Gaussian distribution; and a uniform random distribution.

10. The method of claim 8, wherein the second noise is introduced using a distribution from a list comprising: a Gaussian distribution; and a uniform random distribution.

11. The method of claim 8, wherein the magnitude of the second noise is large enough to erase all information about the first noise.

12. The method of claim 8, wherein the second noise is at least 20 bits larger than the first noise.

13. The method of claim 8, wherein a homomorphic operation is performed on the encrypted complex input with added first noise and second noise prior to decrypting.

14. A system for cryptography based on 128 bit integers, the system comprising:
a system device performing encryption by:
receiving a complex input to be encrypted, wherein the input comprises a 128-bit number;

setting an imaginary part of the complex input to a predetermined value;
encrypting the complex input using a Fourier transform and a scaling factor;
adding a first noise and a second noise to the encrypted complex input, wherein the second noise obfuscates the first noise; and
a system device performing decryption by:
receiving an encrypted message with the encrypted complex input with added first noise and second noise over a network connecting the system devices performing the encrypting and decrypting;
estimating a first standard deviation of the first noise based on an imaginary part of the received encrypted complex input;
computing a second standard deviation of the second noise based on the first standard deviation of the first noise and a predetermined parameter; and
decrypting the encrypted message using an inverse of the encrypting Fourier transform, the first noise, and the second noise.

15. The system of claim 14, wherein the system device performing encryption and the system device performing decryption each use at least one processor that is a 128 bit processor.

16. The system of claim 14, wherein a homomorphic operation is performed on the encrypted complex input with added first noise and second noise prior to decrypting.

\* \* \* \* \*